United States Patent
Wang

(10) Patent No.: US 9,754,006 B2
(45) Date of Patent: Sep. 5, 2017

(54) SYSTEM AND METHOD FOR PROCESSING LONG RELATION CHAIN DATA OF USER

(71) Applicant: TENCENT TECHNOLOGY (SHENZHEN) COMPANY LIMITED, Shenzhen (CN)

(72) Inventor: Hui Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 59 days.

(21) Appl. No.: 14/646,794

(22) PCT Filed: Oct. 14, 2013

(86) PCT No.: PCT/CN2013/085153
§ 371 (c)(1),
(2) Date: May 22, 2015

(87) PCT Pub. No.: WO2014/079290
PCT Pub. Date: May 30, 2014

(65) Prior Publication Data
US 2015/0286696 A1   Oct. 8, 2015

(30) Foreign Application Priority Data
Nov. 26, 2012   (CN) .......................... 2012 1 0483647

(51) Int. Cl.
G06F 17/30    (2006.01)
G06Q 50/00    (2012.01)

(52) U.S. Cl.
CPC .. *G06F 17/30581* (2013.01); *G06F 17/30132* (2013.01); *G06F 17/30174* (2013.01);
(Continued)

(58) Field of Classification Search
CPC .......... G06F 17/30377; G06F 12/0897; G06F 17/30604; G06Q 50/01
See application file for complete search history.

(56) References Cited

U.S. PATENT DOCUMENTS 7,412,569 B2 * 8/2008 Naveh ................. G06F 12/0804
                                                  711/113
2009/0313244 A1 * 12/2009 Sokolenko ........ G06F 17/30864
2010/0115061 A1    5/2010 Tai et al.

FOREIGN PATENT DOCUMENTS

CN         1925530 A      3/2007
CN       101247417 A      8/2008
(Continued)

OTHER PUBLICATIONS

Written Opinion (English translation), International Application No. PCT/CN2013/085153, dated Jan. 23, 2014.
(Continued)

*Primary Examiner* — Marc Filipczyk
(74) *Attorney, Agent, or Firm* — Anova Law Group, PLLC

(57) ABSTRACT

A cache module responds to an operation request, from a front end, for long relation chain data of a user, and synchronously sends a modification request in the operation request to a receiving module; the receiving module receives the modification request from the cache module, and synchronously stores the modification request into an operation log file of a storage device; a saving module reads the modification request in the operation log file of the receiving module, and modifies the long relation chain data in a database (DB) according to the read modification request.

16 Claims, 3 Drawing Sheets

(52) U.S. Cl.
CPC .. *G06F 17/30345* (2013.01); *G06F 17/30604* (2013.01); *G06Q 50/01* (2013.01)

(56) References Cited

FOREIGN PATENT DOCUMENTS

| | | |
|---|---|---|
| CN | 101364217 A | 2/2009 |
| CN | 101826073 A | 9/2010 |
| CN | 101876996 A | 11/2010 |
| CN | 101916298 A | 12/2010 |
| CN | 102024040 A | 4/2011 |
| CN | 102238178 A | 11/2011 |
| CN | 102289469 A | 12/2011 |
| WO | WO-2010050288 A1 | 5/2010 |

OTHER PUBLICATIONS

Search Report in International Application No. PCT/CN2013/085153 dated Jan. 23, 2014.
International Preliminary Report on Patentability and Written Opinion for International Application No. PCT/CN2013/085153, dated Jun. 4, 2015.
Office action in CN Application No. 201210483647.5 dated Sep. 2, 2016.
Office action in CN Application No. 201210483647.5 dated Jan. 19, 2017.

\* cited by examiner

SYSTEM AND METHOD FOR PROCESSING LONG RELATION CHAIN DATA OF USER

RELATED APPLICATION

This application claims priority to Chinese Patent Application No. 201210483647.5, filed with the Chinese Patent Office on Nov. 26, 2012 and entitled "SYSTEM AND METHOD FOR PROCESSING LONG RELATION CHAIN DATA OF USER", which is incorporated herein by reference in its entirety.

FIELD OF THE TECHNOLOGY

This application relates to the field of computers and Internet data processing technologies, and in particular, to a system and a method for processing long relation chain data of a user.

BACKGROUND OF THE DISCLOSURE

At present, with the development of Internet technologies, a network has gradually become an important source for people to obtain information. Especially, after the Internet enters the Web2.0 era, users are both browsers of website content and makers of website content. Content created with involvement of a user is referred to as user generated content (UGC), such as a journal and photo released by the user. In the Web2.0 era, due to emergence of large amounts of UGC, the amount of network information grows exponentially.

At present, one of the most active network communications systems is a social network service (SNS) system. The SNS is briefly referred to as a social network system, which is an Internet application service system that aims to help people to build a social network. At present, almost all website systems are expanding social convenience thereof, to add an SNS feature to the website systems. In this specification, all website systems having an SNS feature, for example, an online community system, a blog system, and a microblog system (briefly referred to as microblog), are collectively referred to as a social network system.

In the SNS, each user releases information, and a large amount of UGC is generated almost at every moment. Besides, each user has a respective relation chain. A relation chain of a user mainly includes a user group that can interact with the user in the SNS. User relation chain data includes information such as an identifier and attribute of each user in the group, and a relation between each user and the primary user. The relation chains of some users have a huge amount of users. Such a relation chain is referred to as a long relation chain in the industry, and a user having a long relation chain is referred to as a long relation chain user.

For example, microblog is an SNS system of information sharing, distribution and obtaining based on a user relation. A user can access the microblog by using a wired communications network or a wireless communications network, and various clients, update information by using a specified number of words and/or other multimedia information, and implement instant sharing. In the microblog system, each user can listen to (or follow) another user, that is, microblog information (that is, UGC) released by a user that is listened to (or followed) by the user can be transmitted to microblog of the user in time. A user listening is an "audience" (which is also referred to as a "fan" in some microblog systems, the audience is used as an example for description in this specification) of a user that is listened to. Certainly, all users can also be listened to (or followed) by other users. When the number of audiences of a user exceeds a certain number, the user becomes a long relation chain user, for example, some star users in microblog generally have millions or even tens of millions audiences.

In an SNS in which UGC is generated, because data is generated by users, a mass number of users lead to a mass amount of data, and finally cause a great deal of data read and write requests. Especially for data processing of a long relation chain user, because a long relation chain of the user includes millions or even tens of millions of audiences, when an audience is added or deleted, data modification needs to be performed on a long relation chain of a user that is listened to; therefore, the number of requests for long relation chain data is huge, which are triggered frequently, and consequently, the number of operations on a corresponding database (DB) is also huge and the operations are performed frequently. Therefore, the long relation chain data of the user needs special processing.

FIG. 1 is a system for processing long relation chain user data in the existing technology. Referring to FIG. 1, the system mainly includes a cache module and a saving module. A DB stores full long relation chain data of a long relation chain user, for example, a full audience list in a microblog system. However, because the long relation chain user does not need the full audience list when reading microblog, in order to respond to a read request for an audience list from this type of long relation chain user at a font end at top speed, a part of an audience list of each long relation chain user is saved in the cache module of memory according to update time. The cache module is configured to respond to operation requests, from a front end (that is, a user operation end, such as a client or a webpage front end), for long relation chain data of the long relation chain user. Because operation of the memory is quick, the read request for the relation chain data of the long relation chain user may be responded to at top speed. For write operation requests, that is, modification requests for performing saving modification on corresponding DBs, the modification requests need to be synchronized to the saving module, and the saving module modifies data in the DBs according to the modification requests.

However, the foregoing existing technology has the following defects:

The cache module performs a pure memory operation, the saving module performs an operation on an underlying DB directly, and a speed of the DB operation and a speed of the pure memory operation are not on the same order of magnitude, which are greatly differed. In order to solve the problem that the speed of the cache module and the speed of the saving module are inconsistent, the cache module needs to store an operation log of a long relation chain user for a long time, and can release space occupied by the operation log only when the saving module completes the DB operation. Therefore, in the existing technology, saving and storage of long relation chain data of a user seriously relies on the cache module, where not only a large amount of memory space of the cache module is occupied, but also once the cache module restarts abnormally, the memory is cleared, and thus a large number of modification requests are lost, leading to serious inconsistency between long relation chain data in a DB and a front-end operation, and a high data error rate.

SUMMARY

In view of this, the main objective of this application is to provide a system and a method for processing long relation chain data of a user, so as to reduce the probability of a modification request loss, and lower the data error rate of long relation chain data in a DB.

The technical solutions of this application are implemented as follows:

A system for processing long relation chain data of a user includes: a cache module, a receiving module and a saving module, the cache module being disposed in memory and configured to: respond to an operation request, from a front end, for the long relation chain data of the user, and synchronously send a modification request in the operation request to the receiving module;

the receiving module being configured to receive the modification request from the cache module, and synchronously store the modification request into an operation log file of a non-memory storage device; and the saving module being configured to read the modification request in the operation log file of the receiving module, and modify the long relation chain data in a DB according to the read modification request.

A method for processing long relation chain data of a user includes:

caching, by a cache module, an operation request, from a front end, for the long relation chain data of the user, and synchronously sending a modification request in the operation request to an aftermentioned receiving module;

receiving, by the receiving module, the modification request from the cache module, and synchronously storing the modification request into an operation log file of a non-memory storage device; and reading, by a saving module, the modification request in the operation log file of the receiving module, and modifying the long relation chain data in a DB according to the read modification request.

A storage medium is configured to store a computer executable instruction, the computer executable instruction being used for controlling a processor to execute a method for processing long relation chain data of a user, and the method including:

responding to an operation request, from a front end, for the long relation chain data of the user, and synchronously storing a modification request in the operation request into an operation log file of a non-memory storage device; and reading the modification request in the operation log file, and modifying the long relation chain data in a DB according to the read modification request.

Compared with the existing technology, in an embodiment of this application, a receiving module is introduced, where a cache module synchronizes a modification request, from a front end, for long relation chain data of a user to the receiving module, and the receiving module synchronously stores the modification request into an operation log file of a non-memory storage device; besides, the saving module does not obtain the modification request from the front end from the cache module, but obtains the modification request by reading the operation log file of the receiving module, and modifies the long relation chain data in a DB according to the modification request. Therefore, in this application, the cache module and the saving module are decoupled successfully; one receiving module is added to coordinate a quick modification request operation and a slow a DB operation, a synchronization speed at which the modification request is synchronized from the cache module to the receiving module is fast, and the operation log file in the receiving module can be stored for a long time so as to be read by the saving module. In this way, the cache module does not need to store an operation log for a long relation chain user for a long time, memory space occupied by the cache module is reduced, and the probability of a modification request loss when the cache module restarts abnormally is also reduced, so that consistence between long relation chain data in a DB and a front-end operation is ensured, and the data error rate of the long relation chain data in the DB is lowered.

DESCRIPTION OF EMBODIMENTS

This application is further described in detail in the following with reference to the accompanying drawings and specific embodiments.

Figure 2:
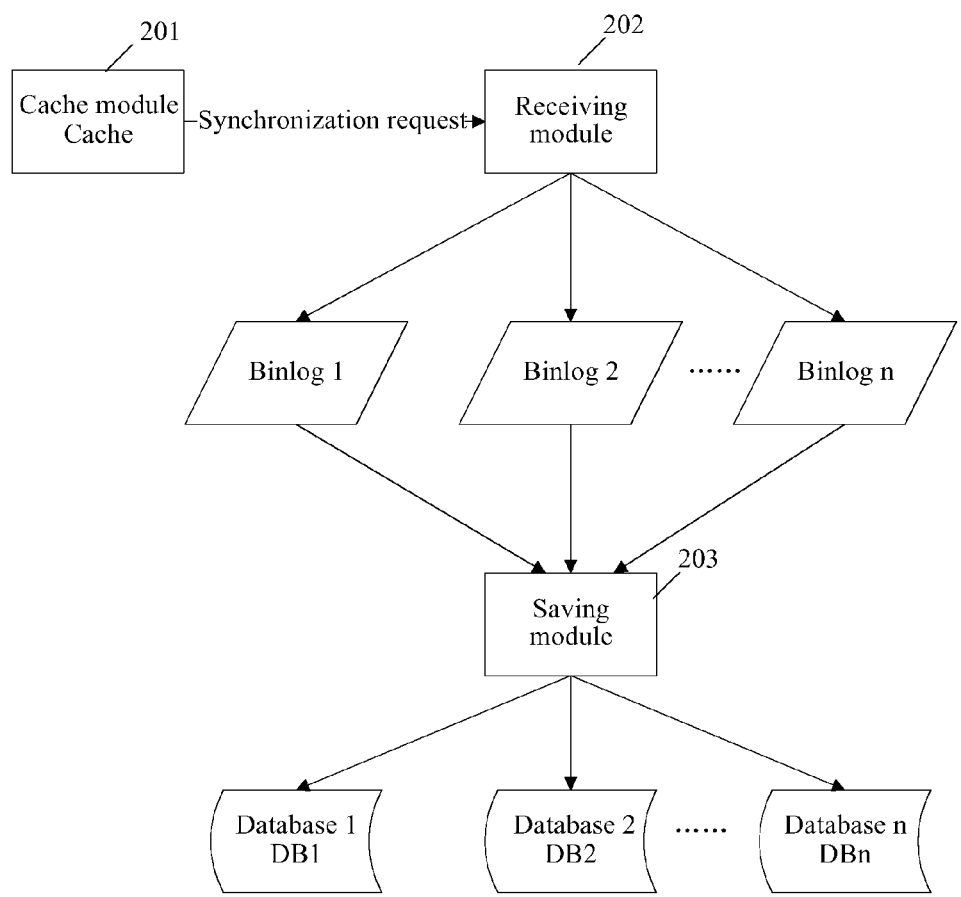
FIG. 2 is a schematic composition diagram of a system for processing long relation chain data of a user according to this application.

FIG. 2 is a schematic composition diagram of a system for processing long relation chain data of a user according to this application. Referring to FIG. 2, the processing system includes a cache module 201, a receiving module 202 and a saving module 203.

The cache module 201 is disposed in memory. Some of latest updated long relation chain data of a long relation chain user is cached in the cache module 201, to respond to operation requests, from a front end (that is, a user operation end, such as a client or a webpage front end), for the long relation chain data of the user. For most read requests in the operation requests, data may be read directly from the cache module 201 and read results are returned to the front end, thereby responding to the requests and reading the relation chain data of the long relation chain user at top speed. For modification requests, from the front end, for the long relation chain data of the user, such as an audience adding request, an audience deleting request, and an audience modification request in a microblog system, these modification requests are synchronously sent to the receiving module 202.

The receiving module 202 is configured to receive a modification request from the cache module 201, and synchronously store the modification request as a log record into an operation log file (Binlog) of a non-memory storage device, that is, the operation log file is not stored in the memory, but is stored in a storage device such as a hard disk. Because the number of modification requests for long relation chain data of long relation chain users is huge, a new operation log file may be added to store a modification request after one operation log file is fully written. A speed of writing to an operation log file is much faster than a speed of a DB operation, and is slightly differed from a speed of memory reading, so that the modification request received in the cache module 201 may be quickly synchronized to the receiving module 203.

The saving module 203 is configured to operate a DB, and is specifically configured to read a log record, that is, a modification request in the operation log file of the receiving module 202, and modify long relation chain data in the DB according to the read modification request. For example, if it is a request for adding an audience to the long relation chain user, add the audience to the long relation chain data of the user in the DB.

Because a speed of operating an underlying DB is greatly differed from a speed of operating memory, the saving module 203 needs to spend a long time in reading the operation log file of the receiving module 202. However, the operation log file is stored in the non-memory storage device, and thus the operation log file is not lost even if shutdown occurs due to causes such as failure and repair, so that the probability of a modification request loss is reduced, consistence between long relation chain data in a DB and a front-end operation is further ensured, and the data error rate of the long relation chain data in the DB is lowered. In addition, the cache module 201 in the memory can quickly synchronize the modification request for the long relation chain data of the user to the receiving module 202, and therefore, the cache module 201 does not need to store an operation log for the long relation chain user for a long time, and memory space occupied by the cache module 202 is reduced.

Figure 1:
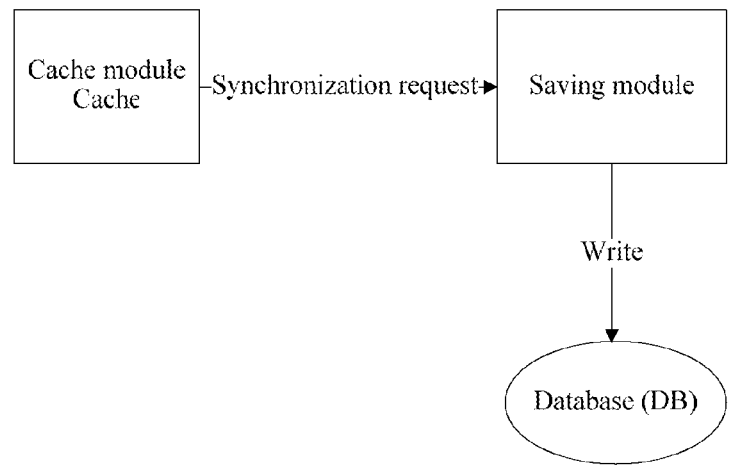
FIG. 1 is a system for processing long relation chain data of a user in the existing technology.

In addition, the existing technology shown in FIG. 1 further has a defect that it is difficult to expand a module, that is, a saving module in the existing technology stores long relation chain data of a long relation chain user into only one DB. When the system data volume increases, system capacity expansion is needed, and a new saving module and a new DB having a larger capacity need to be created during capacity expansion, and then data in the original DB is all migrated to the new DB. Full data migration is needed each time expansion is performed, which causes difficulties in operation and maintenance of a system device.

As an improvement, in an embodiment of this application, the system for processing long relation chain data of a user further includes a user division module, configured to perform unit division for users, and notify the cache module 201, the receiving module 202 and the saving module 203 of unit information. The performing unit division for users is grouping the users, and each group is referred to as a unit, which facilitates expansion.

In this embodiment, the cache module 201 is further configured to: distinguish a unit to which a user that initiates the modification request belongs, and synchronously send the modification request and unit information of the user to the receiving module.

The receiving module 202 is further configured to: correspondingly create at least one operation log file for each different unit separately, as shown in FIG. 2, and synchronously store the modification request into an operation log file of the unit corresponding to the modification request. For one unit, after one operation log file is fully written, a new operation log file may be added to store a modification request corresponding to the unit.

The saving module is further configured to: correspondingly create different DBs for the different units according to the unit information, as shown in FIG. 2, and during DB modification, modify long relation chain data in a DB of the unit corresponding to the modification request according to the read modification request.

In this application, users are divided into units, so that a minimum processing unit is formed. In a process of processing long relation chain data of a user, the unit is used as a unit for both the receiving module 202 and the saving module 203 to process a modification request and perform storage and saving. When the total number of users in an SNS system grows, a newly added user may be divided into a new unit. When capacity expansion needs to be performed on the receiving module 202 and the saving module 203, a new processing device (for example, a server) may be added to receive a receiving module and a saving module and a DB that are newly expanded in capacity. Only an operation log file of a to-be-migrated unit needs to be copied into the newly added receiving module, and the newly added receiving module, saving module and DB are started, and then route information of the newly added receiving module in added into the cache module, so that the cache module may synchronously send a modification request of the new unit to the new receiving module. If capacity expansion needs to be performed on a DB, it is only required to stop running of the saving module, copy data of the original DB into a destination or add a DB corresponding to a newly added unit, modify routing information of the newly added DB in the saving module, and then start the saving module.

In this application, because unit division processing is used, capacity expansion of the receiving module, the saving module and the DB is facilitated, and therefore operation and maintenance are simple. In addition, because capacity expansion of a related device can be performed very conveniently, capacity expansion processing of a device can be performed in time when a sudden data volume burst occurs, and it is ensured that the entire SNS system responds to a data request from a front end at a fast speed.

In another embodiment of this application, the receiving module 202 is further configured to: record, in the memory and for each unit, synchronization progress information of synchronous storage of the modification request, and feed back the synchronization progress information to the cache module 201; and after the receiving module is shut down and restarted, scan, for each unit, an operation log file of the unit, restore synchronization progress information of the unit according to a latest operation log file of the unit, and feed back the synchronization progress information of the unit to the cache module. The cache module 201 is further configured to: synchronously send, according to the progress information of each unit fed back by the receiving module 202, a modification request, after the progress, of a corresponding unit to the receiving module.

For example, if progress information, fed back by the receiving module 202, of the $i^{th}$ unit is the $1000^{th}$, after receiving the progress feedback, the cache module 201 sends the $1001^{th}$ modification request of the $i^{th}$ unit and subsequent modification requests of the $1001^{th}$ modification request. Therefore, it can be further ensured that after the receiving module 202 is shut down and restarted due to causes such as failure and operation and maintenance actions, a modification request that is not successfully synchronized during shutdown of the receiving module 202 can be quickly automatically synchronized, thereby reducing difficulties in operation and maintenance.

Specifically, the receiving module 202 specifically includes a synchronization progress recording module, configured to: record the synchronization progress information, and each time an operation of synchronously storing a modification request into an operation log file is completed, add 1 to synchronization progress information of a unit corresponding to the operation log file, thereby achieving that the synchronization progress information of the modification request is synchronously stored.

In still another embodiment, the saving module 203 may be further configured to: record, in the memory and for each unit, reading progress information for a modification request in an operation log file of the unit, and each time reading of one operation log file is completed, mark the file to already read; and after the saving module 203 is shut down and restarted, scan, for each unit, an operation log file of the unit, restore reading progress information of the unit according to an unread operation log file that is stored for a longest time, continue to read a modification request in an operation log file of the unit according to the reading progress information of the unit, and modify long relation chain data in a DB according to the read modification request. In this way, it can be further ensured that after the saving module 203 is shut down and restarted due to causes such as failure and operation and maintenance actions, a reading process can be automatically and quickly restored to that before the shutdown, thereby reducing difficulties in operation and maintenance.

Specifically, the saving module 203 specifically includes a reading progress recording module, configured to: record the reading progress information, and each time one record in an operation log file of a unit is read, add 1 to a reading progress of the corresponding unit, thereby achieving that the reading progress information of the modification request in the operation log file of the unit is recorded.

Figure 3:
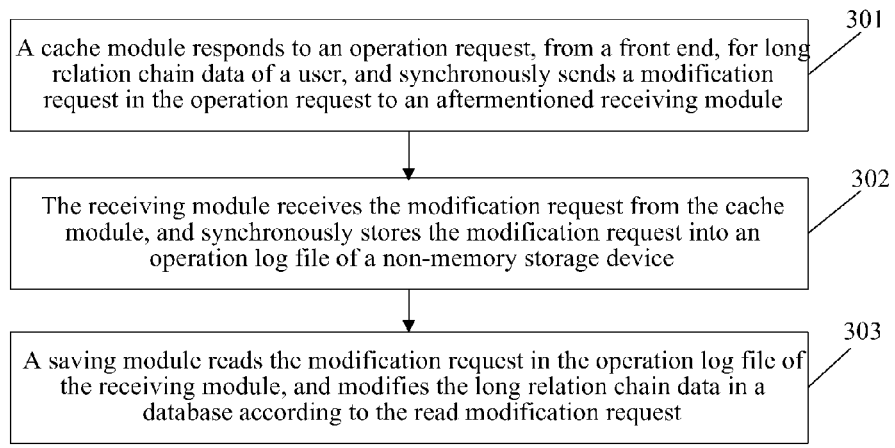
FIG. 3 is a flowchart of a method for processing long relation chain data of a user according to this application.

Corresponding to the foregoing system, this application further discloses a method for processing long relation chain data of a user, which can be executed by the system. FIG. 3 is a flowchart of the method for processing long relation chain data of a user according to this application. Referring to FIG. 3, the method includes:

301: A cache module 201 responds to an operation request, from a front end, for the long relation chain data of the user, and synchronously sends a modification request in the operation request to an aftermentioned receiving module 202.

302: The receiving module 202 receives the modification request from the cache module 201, and synchronously stores the modification request into an operation log file of a non-memory storage device.

303: A saving module 203 reads the modification request in the operation log file of the receiving module 202, and modifies the long relation chain data in a DB according to the read modification request.

In order to further facilitate capacity expansion of a module and database, and to improve the efficiency of operation and maintenance, in another embodiment, the method further includes:

performing unit division for users, and notifying the cache module 201, the receiving module 202 and the saving module 203 of unit information, where the performing unit division for users is grouping the users, and each group is referred to as a unit; a specific method for performing unit division for users may, for example, include: setting a specified unit size, numbering the users in a system sequentially, and setting values by modulo for numbers of the users by using the unit size, where users having a same modulo value belong to a same unit; or rounding numbers of the users by using the unit size, where users having same round numbers belong to a same unit; and the cache module 201 further distinguishes a unit to which a user that initiates the modification request belongs, and synchronously sends the modification request and unit information of the user to the receiving module 202; the receiving module 202 further correspondingly creates at least one operation log file for each different unit separately, and synchronously stores the modification request into an operation log file of the unit corresponding to the modification request; and the saving module 203 further correspondingly creates different DBs for the different units according to the unit information, and during DB modification, modifies long relation chain data in a DB of the unit corresponding to the modification request according to the read modification request.

In an embodiment, the method of this application may further include:

recording, by the receiving module 202, in the memory and for each unit, synchronization progress information of synchronous storage of the modification request, and feeding back the synchronization progress information to the cache module 201, where a specific manner of recording synchronization progress information of synchronous storage of the modification request includes: adding, each time an operation of synchronously storing a modification request into an operation log file is completed, 1 to synchronization progress information of a unit corresponding to the operation log file; and after the receiving module 202 is shut down and restarted, scanning, for each unit, an operation log file of the unit, restoring synchronization progress information of the unit according to a latest operation log file of the unit, and feeding back the synchronization progress information of the unit to the cache module 201; and synchronously sending, by the cache module 201, according to the progress information of each unit fed back by the receiving module 202, a modification request, after the progress, of a corresponding unit to the receiving module 202, where the restoring synchronization progress information according to a latest operation log file of the unit specifically includes: determining the number n of operation log files of the unit that are stored before the latest operation log file, multiplying the number by a recording capacity n of one operation log file, and using m×n as the synchronization progress information of the unit.

In still another embodiment, the method in this application may further include:

recording, by the saving module 203, in the memory and for each unit, reading progress information for a modification request in an operation log file of the unit, and each time reading of one operation log file is completed, marking the file to already read, where a specific manner of recording, in the memory, reading progress information for a modification request in an operation log file of the unit specifically includes: adding, each time one record in an operation log file of a unit is read, 1 to a reading progress of the corresponding unit; and after the saving module 203 is shut down and restarted, scanning, for each unit, an operation log file of the unit, restoring reading progress information of the unit according to an unread operation log file that is stored for a longest time, continuing to read a modification request in an operation log file of the unit according to the reading progress information of the unit, and modifying the long relation chain data in the DB according to the read modification request, where a specific manner of restoring reading progress information of the unit according to an unread operation log file that is stored for a longest time includes: determining the number M of operation log files of the unit that are stored before the unread operation log file that is stored for the longest time, multiplying the number by a recording capacity n of one operation log file, and using M×n as the reading progress information of the unit.

Figure 4:
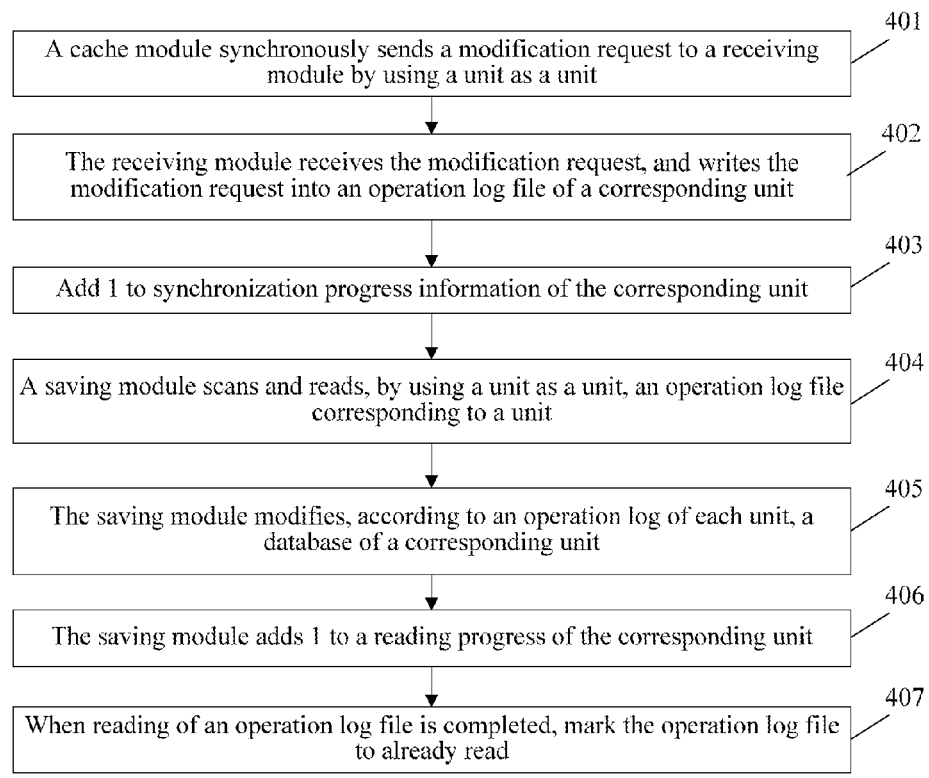
FIG. 4 is a flowchart of a specific embodiment according to this application.

A more specific embodiment is used below to further describe the method in this application. FIG. 4 is a flowchart of the specific embodiment according to this application. Referring to FIG. 2 and FIG. 4, assuming that unit division is performed in advance on all users in a system according to a specified unit size (for example, 4999), the process includes:

Step 401: A cache module 201 synchronously sends a modification request, from a front end, for long relation chain data of a user to a receiving module 202 by using the specified unit size as a unit.

Step 402: The receiving module 202 receives the modification request synchronously sent by the cache module 201, distinguishes a unit of the modification request, and records the modification request as an operation log into an operation log corresponding to the unit, to form an operation log file.

Step 403: Each time an operation of synchronously storing a modification request into an operation log file is completed, add 1 to synchronization progress information of a unit corresponding to the operation log file, and instruct the cache module 201 to synchronously send a next modification request of the unit.

Step 404: A saving module 203 scans and reads an operation log file in the receiving module 202 by using a unit as a unit.

Step 405: The saving module 203 modifies, according to a modification request recorded in an operation log file corresponding to each unit, an underlying DB of a corresponding unit.

Step 406: Each time the saving module 203 reads one record in an operation log file of a unit, the saving module adds 1 to a reading progress of the corresponding unit.

Step 407: Each time the saving module 203 completes reading an operation log file, the saving module 203 marks the operation log file to already read.

Figure 5:
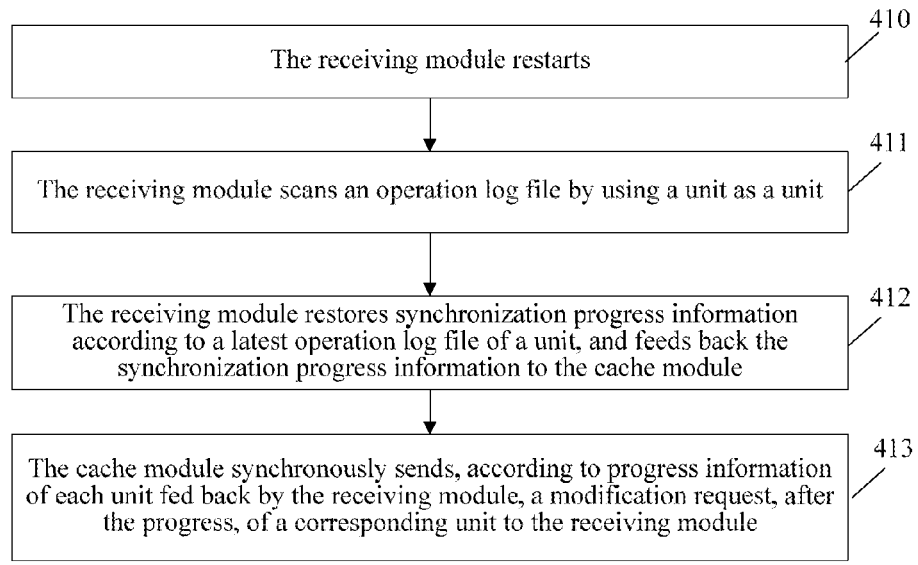
FIG. 5 is a flowchart during restarting of a receiving module due to operation and maintenance actions, machine restarting or module abnormality in the embodiment described in FIG. 4.

FIG. 5 is a flowchart during restarting of the receiving module 202 due to operation and maintenance actions, machine restarting or module abnormality according to the embodiment described in FIG. 4. Referring to FIG. 5, the process specifically includes:

Step 410: The receiving module 202 restarts.

Step 411: The receiving module 202 scans, for each unit by using the unit as a unit, an operation log file of the unit.

Step 412: Restore synchronization progress information of the unit according to a latest operation log file of the unit, and feed back the synchronization progress information of the unit to the cache module 201. For example, it specifically is: determining the number m of operation log files of the unit that are stored before the latest operation log file, multiplying the number by a recording capacity n of one operation log file, and using m×n as the synchronization progress information of the unit.

Step 413: The cache module 201 synchronously sends, according to the progress information of each unit fed back by the receiving module 202, a modification request, after the progress, of a corresponding unit to the receiving module 202.

Figure 6:
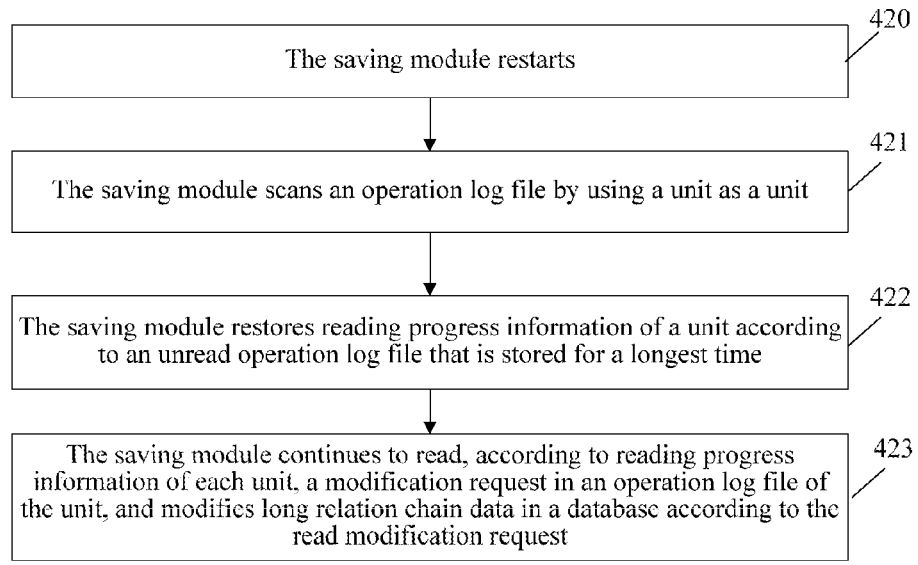
FIG. 6 is a flowchart during restarting of a saving module due to operation and maintenance actions, machine restarting or module abnormality in the embodiment described in FIG. 4.

FIG. 6 is a flowchart during restarting of the saving module 203 due to operation and maintenance actions, machine restarting or module abnormality according to the embodiment described in FIG. 4. Referring to FIG. 6, the process specifically includes:

Step 420: The saving module 203 restarts.

Step 421: The saving module 203 scans, for each unit by using the unit as a unit, an operation log file of the unit.

Step 422: The saving module 203 restores reading progress information of the unit according to an unread operation log file that is stored for a longest time. For example, it specifically is: determining the number M of operation log files of the unit that are stored before the unread operation log file that is stored for the longest time, multiplying the number by a recording capacity n of one operation log file, and using M×n as the reading progress information of the unit.

Step 423: The saving module 203 continues to read, according to the reading progress information of each unit, a modification request in an operation log file of the unit, for example, starts to read a modification request from the $(M+1)^{th}$ operation log file, and modifies long relation chain data in a DB according to the read modification request.

The method and system provided in this application may be implemented by hardware, or a computer readable instruction, or a combination of hardware and a computer readable instruction. The computer readable instruction used in this application is stored by multiple processors in a readable storage medium, such as a hard disk, a CD-ROM, a DVD, an optical disc, a floppy disk, a tape, a RAM, a ROM, or another suitable storage device. Alternatively, at least some computer readable instructions may be replaced with specific hardware, such as a customized integrated circuit, a gate array, an FPGA, a PLD, and a computer with a specific function.

This application provides a computer readable storage medium, configured to store an instruction so as to make a system or device execute the method described in this specification. Specifically, the system or device provided in this application both has a storage medium, which stores computer readable program code used for implementing functions in any one of the foregoing embodiments, and the system or device (or CPU or MPU) can read and execute the program code stored in the storage medium.

In this case, the program code read from the storage medium can implement any one of the foregoing embodiments, and therefore the program code and the storage medium that stores the program code are some of the technical solutions.

The storage medium used for providing the program code includes a floppy disk, a hard disk, a magneto-optical disk, an optical disc (for example, a CD-ROM, a CD-ft a CD-RW, a DVD-ROM, a DVD-RAM, a DVD-RW, or a DVD+RW), a magnetic disk, a flash memory card, a ROM, and the like. Optionally, the program code may also be downloaded from a server by using a communications network.

It should be noted that, because for program code executed by a computer, at least some operations that are implemented by the program code may be implemented by an operating system running on the computer, so as to implement the technical solutions of any one of the foregoing embodiments, where the computer executes an instruction based on the program code.

In addition, the program code in the storage medium is written into a memory, and the memory is located at an expansion board inserted into a computer, or located at an expansion unit connected to a computer. In an embodiment, a CPU in the expansion board or expansion unit executes, according to an instruction and based on the program code, at least some operations, so as to implement the technical solutions of any one of the foregoing embodiments.

The foregoing descriptions are merely preferred embodiments of this application, but are not intended to limit this application. Any modification, equivalent replacement, or improvement made within the spirit and principle of this application shall fall within the protection scope of this application.

What is claimed is:

1. A system for processing long relation chain data of a user, comprising a memory and a processor communicating with the memory, the memory being configured to store instructions that when executed by the processor configure the system to:
cause a cache module of the memory to respond to an operation request, from a front end, for the long relation chain data of the user, and synchronously send a modification request in the operation request;
receive the modification request from the cache module, and synchronously store the modification request into an operation log file of a non-memory storage device; and
read the modification request in the operation log file, and modify the long relation chain data in a database (DB) according to the read modification request;
wherein when being executed by the processor, the instructions further configure the system to: perform unit division for users, cause the cache module to distinguish a unit to which a user that initiates the modification request belongs, and to synchronously send the modification request and unit information of the user;
correspondingly create at least one operation log file for each different unit separately, and synchronously receive and store the modification request into an operation log file of the unit corresponding to the modification request;
correspondingly create different DBs for the different units according to the unit information, and during DB modification, modify long relation chain data in a DB of the unit corresponding to the modification request according to the read modification request;
record, in the memory and for each unit, synchronization progress information of synchronous storage of the modification request, and feed back the synchronization progress information to the cache module; and during a machine restarting, scan, for each unit, an operation log file of the unit, restore synchronization progress information of the unit according to a latest operation log file of the unit, and feed back the synchronization progress information of the unit to the cache module; and
cause the cache module to synchronously send, according to the progress information of each unit fed back, a modification request listed after a latest synchronized modification request of a corresponding unit.

2. The system according to claim 1, wherein when being executed by the processor, the instructions further configure the system to: use a first counter to record the synchronization progress information of the unit, and each time an operation of synchronously storing a modification request into an operation log file is completed, increase the first counter of the unit corresponding to the operation log file by one.

3. The system according to claim 1, wherein when being executed by the processor, the instructions further configure the system to:
record reading progress information of the corresponding unit after reading the modification request in the operation log file of the corresponding unit; and after reading of the operation log file of the corresponding unit is completed, mark the operation log file as read;
scan, for each unit, the corresponding at least one operation log file of the unit,
restore reading progress information of the unit according to an unread operation log file that is stored for a longest time in the corresponding at least one operation log file,
continue to read a modification request in an operation log file of the unit according to the reading progress information of the unit, and
modify long relation chain data in a DB according to the read modification request.

4. The system according to claim 3, wherein when being executed by the processor, the instructions further configure the system to: use a second counter to record the reading progress information of the unit, and each time one modification request in an operation log file of the unit is read, increase the second counter of the unit corresponding to the operation log file by one.

5. The system according to claim 1, wherein the cache module is further configured to:
respond to the operation request from the front end, the operation request being one of the modification request and a read request, and
when the operation request is the read request, directly respond to the read request based on the long relation chain data in the cache module.

6. The system according to claim 1, wherein the instructions further configure the system to: when one operation log file of the corresponding unit is fully written, add an operation log file for the corresponding unit to store a subsequent modification request of the corresponding unit.

7. The system according to claim 1, wherein the cache module is further configured to obtain route information of an added receiving module corresponding to an operation log file of an added unit of users, and send a modification request from a user belonging to the added unit to the added receiving module based on the route information.

8. The system according to claim 1, wherein the instructions further configure the system to obtain routing information of an added database corresponding to an added unit of users, and modify a long relation chain data of a user belonging to the added unit in the added database based on the routing information.

9. A method for processing long relation chain data of a user, comprising:
caching, by a cache module of the memory, an operation request, from a front end, for the long relation chain data of the user, and synchronously sending a modification request in the operation request to a receiving module;
receiving, by the receiving module, the modification request from the cache module, and synchronously storing the modification request into an operation log file of a non-memory storage device; and
reading, by a saving module, the modification request in the operation log file of the receiving module, and modifying the long relation chain data in the DB according to the read modification request;
wherein the method further comprises:
performing unit division for users, causing the cache module to distinguish a unit to which a user that initiates the modification request belongs, and to synchronously send the modification request and unit information of the user;

correspondingly creating at least one operation log file for each different unit separately, and synchronously receiving and storing the modification request into an operation log file of the unit corresponding to the modification request;

correspondingly creating different DBs for the different units according to the unit information, and during DB modification, modifying long relation chain data in a DB of the unit corresponding to the modification request according to the read modification request;

recording, by the receiving module, synchronization progress information of synchronous storage of the modification request, and feeding back the synchronization progress information to the cache module;

after the receiving module is shut down and restarted, scanning, for each unit, an operation log file of the unit, restoring synchronization progress information of the unit according to a latest operation log file of the unit, and feeding back the synchronization progress information of the unit to the cache module; and synchronously sending, by the cache module, according to the progress information of each unit fed back, a modification request listed after a latest synchronized modification request of a corresponding unit.

10. The method according to claim 9, wherein the recording synchronization progress information of synchronous storage of the modification request comprises: adding, each time an operation of synchronously storing a modification request into an operation log file is completed, 1 to synchronization progress information of a unit corresponding to the operation log file.

11. The method according to claim 9, wherein the restoring synchronization progress information according to a latest operation log file of the unit comprises: determining the number m of operation log files of the unit that are stored before the latest operation log file, multiplying the number by a recording capacity n of one operation log file, and using m×n as the synchronization progress information of the unit.

12. The method according to claim 9, wherein the method further comprises:
recording, by the saving module, reading progress information of the corresponding unit after reading the modification request in the operation log file of the corresponding unit; and, and after reading of the operation log file of the corresponding unit is completed, marking the operation log file as read; and after the saving module is shut down and restarted, scanning, for each unit, the corresponding at least one operation log file of the unit, restoring reading progress information of the unit according to an unread operation log file that is stored for a longest time in the corresponding at least one operation log file, continuing to read a modification request in an operation log file of the unit according to the reading progress information of the unit, and modifying long relation chain data in a DB according to the read modification request.

13. The method according to claim 12, wherein the recording reading progress information further comprises: adding, each time one record in an operation log file of a unit is read, 1 to a reading progress of the corresponding unit.

14. The method according to claim 12, wherein the restoring reading progress information of the unit according to an unread operation log file that is stored for a longest time comprises: determining the number M of operation log files of the unit that are stored before the unread operation log file that is stored for the longest time, multiplying the number by a recording capacity n of one operation log file, and using M×n as the reading progress information of the unit.

15. A non-transitory storage medium, configured to store a computer executable instruction, the computer executable instruction being used for controlling a processor to execute a method for processing long relation chain data of a user, and the method comprising:
responding, by a cache module of the memory, an operation request, from a front end, for the long relation chain data of the user, and synchronously sending a modification request in the operation request to a receiving module;

receiving, by the receiving module, the modification request from the cache module, and synchronously storing the modification request into an operation log file of a non-memory storage device; and reading, by a saving module, the modification request in the operation log file of the receiving module, and modifying the long relation chain data in the DB according to the read modification request;

wherein the method further comprises:
performing unit division for users, causing the cache module to distinguish a unit to which a user that initiates the modification request belongs, and to synchronously send the modification request and unit information of the user;

correspondingly creating at least one operation log file for each different unit separately, and synchronously receiving and storing the modification request into an operation log file of the unit corresponding to the modification request;

correspondingly creating different DBs for the different units according to the unit information, and during DB modification, modifying long relation chain data in a DB of the unit corresponding to the modification request according to the read modification request;

recording, by the receiving module, synchronization progress information of synchronous storage of the modification request, and feeding back the synchronization progress information to the cache module;

after the receiving module is shut down and restarted, scanning, for each unit, an operation log file of the unit, restoring synchronization progress information of the unit according to a latest operation log file of the unit, and feeding back the synchronization progress information of the unit to the cache module; and synchronously sending, by the cache module, according to the progress information of each unit fed back, a modification request listed after a latest synchronized modification request of a corresponding unit.

16. The non-transitory storage medium according to claim 15, wherein the responding to an operation request comprises: caching some of latest long relation chain data updated by the user into memory.

* * * * *